Jan. 17, 1967  W. R. MIKESELL, JR., ETAL  3,298,794
SEALING MEAN FOR PRESSURE VESSELS
Filed Jan. 28, 1964  2 Sheets-Sheet 1

Inventors
Walter R. Mikesell, Jr.
Leonard P. Zick, Jr.
By Merriam, Smith & Marshall
Attorneys

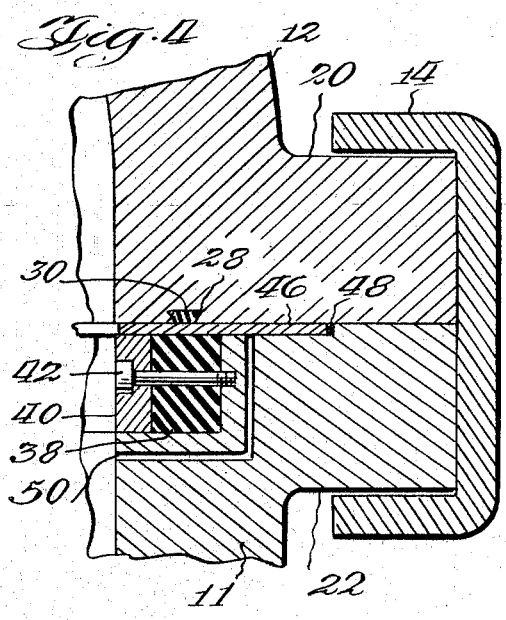
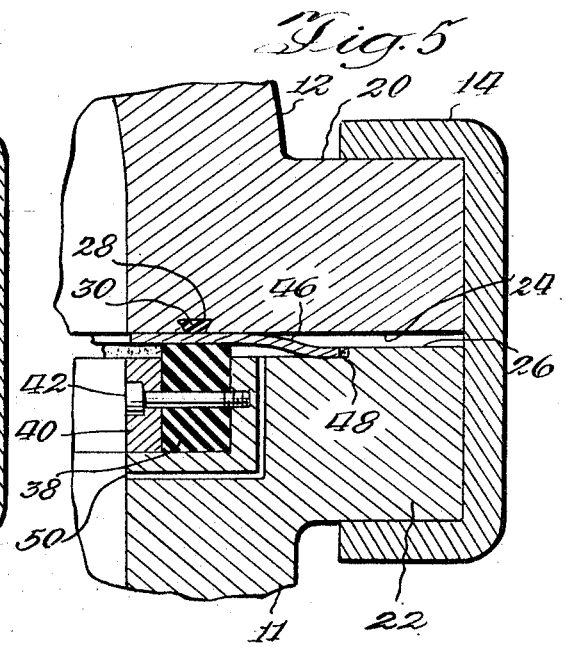
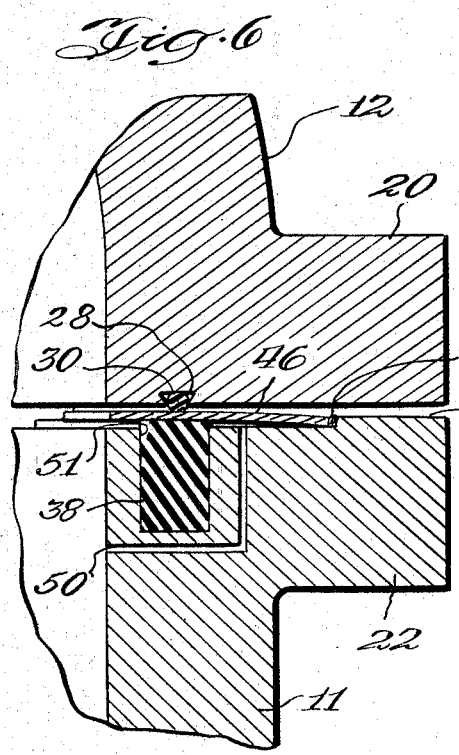
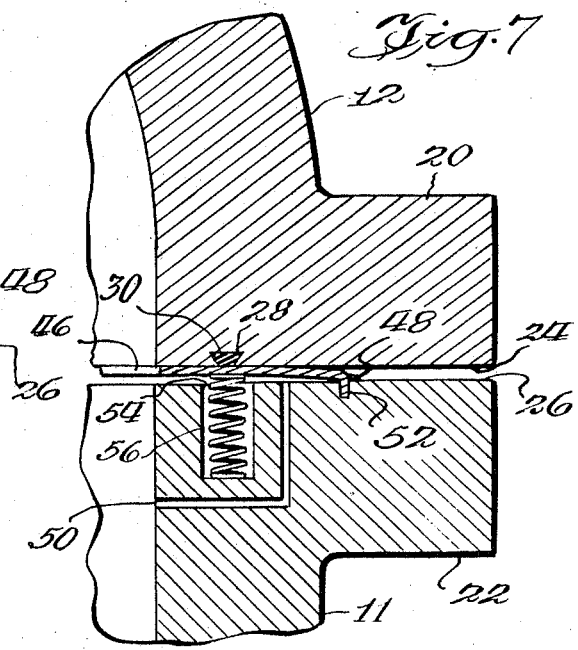

United States Patent Office 3,298,794
Patented Jan. 17, 1967

3,298,794
SEALING MEANS FOR PRESSURE VESSELS
Walter R. Mikesell, Jr., Chicago Heights, and Leonard P. Zick, Jr., Chicago, Ill., assignors to Chicago Bridge & Iron Company, Oak Brook, Ill., a corporation of Illinois
Filed Jan. 28, 1964, Ser. No. 340,749
6 Claims. (Cl. 23—290)

This invention concerns an improvement in autoclave construction, and more particularly, a sealing means for autoclaves. In its more specific aspect, this invention relates to a sealing means for effecting sealing contact between opposed flange members of an autoclave.

The term "autoclave" used herein refers to pressure vessels, which have a wide variety of uses ranging from research testing chambers to industrial processing equipment, and might include batch-type or continuous-type vessels. The operating pressure for these vessels is restricted only by the limitations imposed by the materials of construction.

In the conventional structure, an autoclave generally comprises a substantially cylindrical body having a hemispherical or semi-ellipsoidal head or closure member for the entranceway or opening, and a flange-and-gasket type closure. The autoclave may be vertically or horizontally disposed, or even disposed diagonally, and the autoclave may be substantially spherical. The closure member may comprise a conventional door structure mounted to the body by hinges.

It is essential in an autoclave structure to provide a fluid-tight seat between the body and closure member. The matching surfaces between the members, which are usually widened or flanged, are machined to a fine tolerance to provide a close contact. Generally, a resilient gasket insert is provided in one of the matching surfaces, or the surfaces may be provided with a tongue and groove arrangement, to effect a sealing contact between surfaces. The closure arrangement is secured by a suitable clamp, expandable ring, breech lock ring or the like.

Under operating pressures, the force within an autoclave and acting on the closure may be immense and can easily be in excess of one million pounds. This pressure tends to separate the flange members. As a consequence, the gasket employed in the seating arrangement between the body and closure member might easily be extruded through tthe gap existing between the members, which not only deleteriously affects the service life of the gasket but further may break the seal whereupon operations must be interrupted and the necessary repairs and adjustments be performed. This is surmounted, at least in part, by machining and polishing the matching surfaces to exceptionally fine tolerances. However, in practice absolute precision is not obtained, particularly with large vessels, and therefore this problem is still prevalent.

This invention is directed to an improved arrangement of sealing means between opposed flange members, and which is devoid of the foregoing disadvantages. In our unique structure, the sealing means incorporates the fluid pressure source from the vessel chamber to effect the sealing contact between opposed matching surfaces. Our sealing means is particularly applicable for autoclaves having a quick-opening closure.

In accordance with the present invention, one flange member is provided with a continuous groove, and a resilient sealing gasket is mounted in the groove. Where desired, however, the groove and gasket may be omitted, and the surface of the flange member may be closely machined to fine tolerances, or the surface may be provided with an overlay, preferably of metal, having a substantially smooth or polished surface. Fluid passage is provided for establishing fluid communication between the interior of the autoclave and the gap between the opposed matching faces or surfaces of the flange members. A flexible impervious member, desirably a metal sheet, is attached to the second flange member in such a manner as to be interposed between the opposed surfaces of the flange members, and extends across the fluid passage opening. A suitable bias means provided in the second flange member urges the flexible metal sheet outwardly from the surface of the second flange.

Upon initial seating of the opposed surfaces of the flanges, the flexible metal sheet is urged into face-to-face contacting arrangement with the surface of the opposite flange. The weight of the flange and door, or the force exerted by the clamping means for securing the door to the body, will be sufficient to provide face-to-face contact, and thereby result in compression of the resilient sealing gasket mounted in the first flange member. The initial sealing is sufficient to proceed with pressurizing the vessel, and a quick-opening closure means, such as a C clamp, is applied to the flange members to secure the assembly. As the pressure in the vessel chamber increases, the fluid pressure is transmitted to the space between the flexible metal sheet and the surface of the second flange member. The fluid pressure thus urges the flexible metal sheet outwardly from the surface of the second flange member in a substantially normal direction and into close sealing contact with the surface of the oppositely disposed flange member. During pressure operation of the autoclave, close sealing contact is maintained between the metal sheet and the surface of the first flange.

In order to describe the invention in greater detail, reference is now made to the accompanying drawings illustrating a preferred embodiment of our invention.

FIGURE 4 is a view similar to FIGURE 2 showing initial seating of the opposed flange members.

FIGURE 5 is a view similar to FIGURE 2 showing final sealing of the flange members during pressure operation of the vessel.

FIGURE 6 is a view similar to FIGURE 2 showing an alternative arrangement for the sealing means.

FIGURE 7 is a view similar to FIGURE 2 showing an alternative embodiment for the sealing means.

Figure 1:
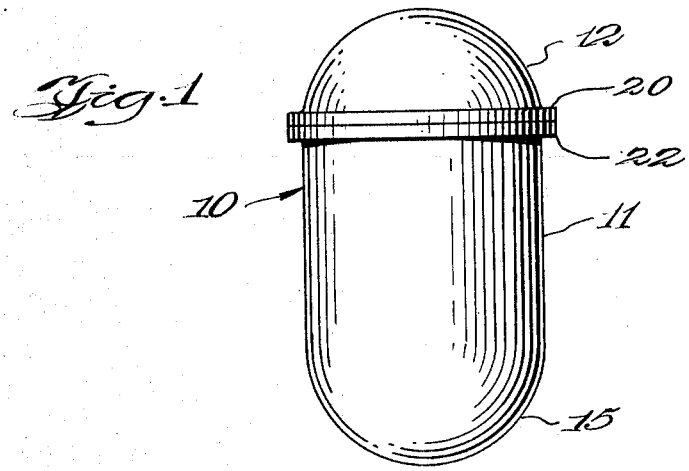
FIGURE 1 is an elevational view of a conventional autoclave, and having peripheral flanges for effecting closure between the cylindrical body and the head portion.

Referring to the drawings wherein like reference numerals designate similar parts throughout, there is shown an autoclave of conventional structure, indicated generally by the numeral 10, having a cylindrical body 11 with integral head 15 and a removable head 12. Closure between cylindrical body 11 and removable head 12 of autoclave 10 is secured by a suitable quick-opening closure means, such as a C clamp 14 (see FIGURE 4) which would include auxiliary locking equipment (not shown). It should be understood that our invention is applicable to other autoclave structures, for example, horizontally disposed cylindrical autoclaves having a suitable door hingedly supported by the body of the autoclave.

In addition, the autoclave might include an external jacket as well as auxiliary equipment such as internal coils for cooling and heating, turbine agitators, etc. which are not shown in the drawings. These autoclaves may range in size from as small as five or ten feet in diameter to as large as 35 feet in diameter, or larger, and may operate under pressures of from 100 p.s.i. to 2,000 p.s.i. or more.

Figure 2:
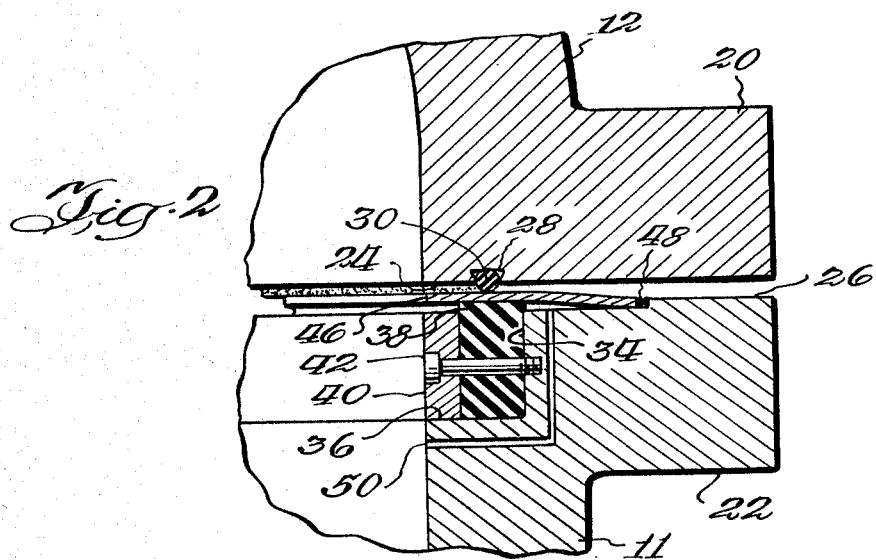
FIGURE 2 is a cross-sectional fragmentary view showing the details of the sealing arrangement of our invention with the opposed peripheral flange members slightly separated from one another.
Figure 3:
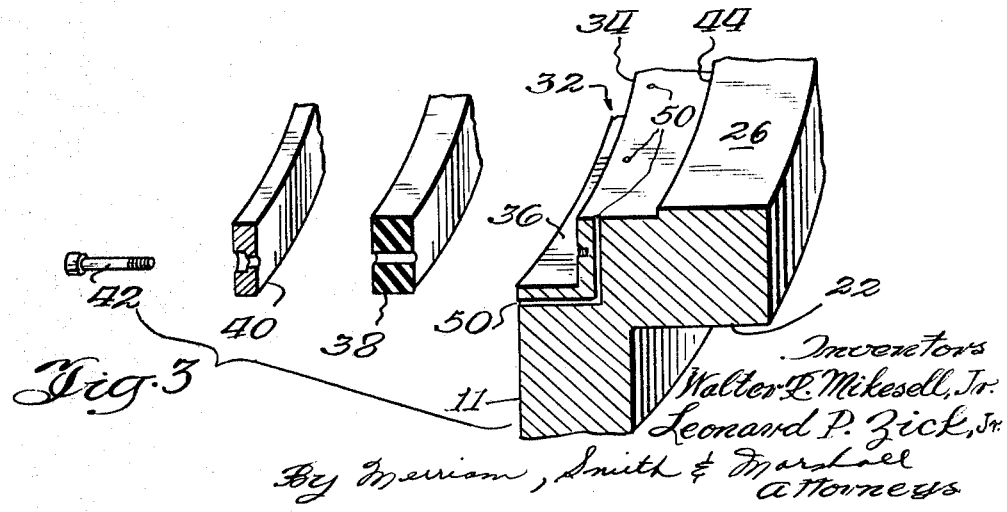
FIGURE 3 is an exploded perspective view showing several of the details of FIGURE 2.

Referring to FIGURES 2 through 4 for details of one embodiment of the sealing means, the peripheries of members 11 and 12 are provided with annular flanges 20 and 22, respectively, which extend outwardly from the side walls of the vessel members. The opposed flanges 20 and 22 have flat mating parallel surfaces 24 and 26, respectively, for effecting seating contact, as explained hereinbelow in detail.

Annular flange 20 of head 12 is provided near its inner periphery with a continuous groove 28 which opens outwardly. A sealing gasket 30, such as an O-ring, made from synthetic rubber, hard rubber plastic, or other suitable material, is inserted in groove 28. The gasket should be sufficiently resilient so as to be compressible upon seating engagement of the body and head. Upon sealing of the vessel members, the resilient gasket assumes the configuration of the groove.

The inner periphery of flange 22 is provided with an annular reduced portion, indicated generally at 32, having lateral side wall 34 and a shoulder 36. This reduced portion is substantially opposite to groove 28, and opens to the inside of the vessel. A resilient ring 38 of generally rectangular cross-section and having a width less than the width of the reduced portion 32, is inserted in the reduced portion along sidewall 34 and shoulder 36. Ring 38 may be formed of hard rubber, synthetic rubber, plastic, or the like, and when not under compression, the ring protrudes beyond shoulder 36. Retainer ring 40, made of metal, abuts resilient ring 38 and shoulder 34, and the assembly is secured in position by means of bolt 42. This particular structure is advantageous in that it provides readily accessible means for repair or replacement of resilient ring 38. That is, during operation, ring 38 may require repairing, or the ring may sufficiently deteriorate to require replacement. Bolt 42 may be removed, retainer ring 40 slipped off, and resilient ring 38 replaced with a new ring.

In addition, surface 26 of flange 22 is recessed at 44 to accommodate thin, flexible sheet 46 made of metal, such as steel, stainless steel, chrome steel, Inconel or the like. As illustrated, the metal sheet is substantially flush with surface 26, to provide a continuous flat mating surface with surface 24. The outer edge of metal sheet 46 is butt welded at 48 to provide an air-tight attachment. The opposite edge of the metal sheet is free, and because the sheet is of flexible metal, the sheet can be flexed or urged outwardly by means of resilient ring 38.

There is provided a means of fluid transmittal such as a fluid passage 50 in flange 22 which opens to the interior of the vessel chamber and to the space between flexible metal sheet 46 and surface 26. During operation of the autoclave, substantially equal pressure is maintained on both sides of the ring 38. Where desired, a plurality of passages 50 may be provided in flange 22 or through the resilient ring 38 at regular spaced intervals. Alternately fluid passage may be provided by making ring 38 in segments. Likewise, retaining ring 40 can be made up of segments.

Upon initial seating of the opposed flange members 20 and 22, the weight of head 12 is usually sufficient to cause compression of gasket ring 30, and the flat mating surfaces 24 and 26 are brought into face-to-face contacting arrangement. If the weight of the head is insufficient to accomplish this action additional force may be provided by auxiliary means such as low pressure pneumatic or hydraulic cylinders. Also, resilient ring 38 is compressed thereby urging interposed metal sheet 46 into sealing contact with end surface 24. Compression of the ring members 30 and 38 is sufficient to allow C clamp 14 (see FIGURE 4) to slip over flanges 20 and 22 which also serve as a means for retaining the opposing flanges. When the vessel chamber is pressurized, the fluid pressure by-passes ring 38 through passage 50 and is transmitted to the opening between sheet 46 and surface 26, thereby urging sheet 46 from the surface. Sheet 46 is urged outwardly in a direction substantially normal to the surface 26, but it should be understood that the distance through which the sheet moves is minute and the direction may be somewhat arcuate. In this manner, the outwardly disposed surface of metal sheet 46 is continuously pressurized against opposed surface 24 of flange 22, and retains compression of gasket 30 as the internal pressure force acts on the elements 11 and 12, thereby bringing the flange faces 20 and 22 into tight contact with the C clamp 14. This effects an air-tight sealing contact between the members. It will be observed that by reason of the bypass, equal pressure is maintained on both sides of resilient ring 38 maintaining intimate contact between face 24 and metal sheet 46 on both sides of gasket 30. As a consequence gasket 30 will not be extruded through the gap. FIGURE 5 illustrates the sealing arrangement, but it should be understood that the distance shown between opposed surfaces 24 and 26 is exaggerated for purposes of clarity.

It will be observed that a quick-opening closure, such as a C clamp, does not maintain the matching end surfaces of the opposed flange members in perfect contact. During operation of the autoclave, the pressure exerted in the gap between opposed flanges 20 and 22 will cause the flanges to separate slightly, which separation may range from about $\frac{1}{64}$ of an inch to $\frac{1}{16}$ of an inch. However, by reason of our invention an air-tight seal is continuously maintained. As a consequence, our invention obviates any need for machining the opposed matching surfaces of the flanges to exceptionally fine tolerances. In addition, extruding of the gasket is eliminated thereby prolonging its service life.

In the modification shown in FIGURE 6, surface 26 of flange 22 may be provided at its inner periphery with a continuous groove 51 which opens outwardly. Groove 51 is positioned substantially opposite groove 28 of flange 20. The resilient ring 38 is inserted in the continuous groove of flange 22. In this manner, retained ring 40 is omitted from the structure. Where desired, fluid passage 50 to the space between sheet 46 and surface 26 may be provided through ring 38 or ring 38 may be in separate segments.

According to the embodiment illustrated in FIGURE 7, metal sheet 46 may be attached to flange 22 by providing the sheet with an inwardly turned lip 52. The flange is provided at its outer periphery with a recess for accommodating lip 52, and the lip is welded for secure attachment thereto.

As explained above, the opposite end of metal sheet 46 is free to flex and can be urged outwardly from surface 26 by suitable bias means. The autoclave is initially sealed and then pressurized thereby effecting a final sealing, as explained above.

As a further modification shown in FIGURE 7, groove 54 of flange 22 may be provided with a plurality of coil springs 56 as a substitute for ring 38 to serve as a bias means. In this manner, the coil springs would urge the flexible metal sheet 46 outwardly from the flat end surface of the flange, and fluid passage may be provided through or between the coil springs.

The foregoing detailed description has been given for clearness of understanding only, and no unnecessary limitations should be understood therefrom, as modifications will be obvious to those skilled in the art.

What is claimed is:

1. In an autoclave construction, a sealing means between a first and a second member having opposed matching surfaces, comprising:

(a) a continuous groove provided in said surface of said first member;

(b) a resilient, annular sealing gasket mounted in said groove of said first member;

(c) an annular channel provided in said surface of said second member substantially opposite the groove in said first member;
(d) a flexible metal sheet extending substantially across said channel of said second member and attached to said second member outwardly from said channel;
(e) resilient material provided in said channel to urge said sheet substantially normal from said surface of said second member;
(f) fluid passage between the interior of said autoclave and the region between said metal sheet and said second member; and
(g) means for pressurizing said autoclave whereby fluid pressure transmitted from the interior of said autoclave via said passage urges said sheet from said surface of said second member to effect a sealing contact between the outwardly disposed surface of said sheet and said surface of said first member.

2. In an autoclave construction according to claim 1, wherein said flexible metal sheet is provided at its outer edge with a peripheral flange and said second member is provided with a recess for accommodating said peripheral flange whereby said sheet is attached to said member, and said resilient material comprises at least one coil spring positioned in said channel.

3. In autoclave construction, a sealing means provided for opposed annular flange members having matching parallel surfaces, comprising:
(a) a continuous groove provided in said surface of the first of said flange members;
(b) a resilient sealing gasket mounted in said groove of said first flange member;
(c) a reduced section provided in the inner periphery of the second of said flange members, said reduced section being substantially opposite to said groove of said first flange member;
(d) an annular recess provided in the end surface of said second flange member;
(e) a flexible metal sheet extending substantially across said annular recess and attached to said second member outwardly from said reduced section and overlying at least a portion of said reduced section;
(f) fluid passage between the interior of said autoclave and the region between said metal sheet and said second member;
(g) means provided in said reduced section to urge said sheet substantially normal from said surface of said second flange member; and
(h) means for pressurizing said autoclave whereby fluid pressure transmitted from the interior of said autoclave via said passage urges said sheet from said surface of said second flange member to effect a sealing contact between the outwardly disposed surface of said sheet and said surface of said first flange member.

4. The autoclave construction according to claim 3 wherein said means for urging said sheet from said surface of said second flange member comprises a resilient ring of generally rectangular cross-section, and an annular retainer means arranged in said reduced section and abuttingly engaging said resilient ring for retaining said resilient ring in position.

5. In an autoclave construction according to claim 3, wherein said flexible metal sheet is provided at its outer edge with a peripheral flange and said second flange member is provided with a recess for accommodating said peripheral flange for attaching said sheet, and said means for urging said sheet comprises coil springs positioned in said reduced section.

6. In autoclave construction, a sealing means for opposing matching first and second surfaces, comprising:
(a) a flexible, impervious member extending across a portion of said first opposed matching surface and attached thereto along the outwardly disposed edge;
(b) an annular channel provided in said first surface and positioned below said flexible, impervious member;
(c) a coil spring positioned in said channel to urge said flexible, impervious member substantially normal from said first surface;
(d) fluid passage from the interior of said autoclave to the region between said flexible, impervious member and said first opposed matching surface; and
(e) means for pressurizing said autoclave whereby fluid pressure transmitted from the interior of said autoclave via said passage urges said flexible, impervious member from said first opposed matching surface to effect a sealing contact between said flexible impervious member and the second opposed matching surface.

References Cited by the Examiner
UNITED STATES PATENTS
1,882,223  10/1932  Lorehn _____ 220—46 X
FOREIGN PATENTS
538,192  7/1941  Great Britain.

MORRIS O. WOLK, *Primary Examiner.*
JAMES H. TAYMAN, JR., *Examiner.*